(12) United States Patent
Stevenson

(10) Patent No.: US 6,386,792 B1
(45) Date of Patent: May 14, 2002

(54) IMPLEMENT FOR FILLING WHEEL TRACKS

(76) Inventor: James E. Stevenson, 330 Goodrich Rd., Wheatland, WY (US) 82201

( * ) Notice: Subject to any disclaimer, the term of this patent is extended or adjusted under 35 U.S.C. 154(b) by 0 days.

(21) Appl. No.: 09/480,207

(22) Filed: Jan. 10, 2000

(51) Int. Cl.[7] ........................ E01C 19/18; A01B 59/048
(52) U.S. Cl. ........................ 404/75; 404/110; 298/27; 172/833
(58) Field of Search .................... 404/75, 78, 101, 404/108, 110, 107; 298/27; 222/1; 172/833; 111/130, 925

(56) References Cited

U.S. PATENT DOCUMENTS

| 1,029,894 | A | * | 6/1912 | Schellenger | 404/101 |
|---|---|---|---|---|---|
| 3,217,620 | A | * | 11/1965 | Mindrum et al. | 404/107 |
| 3,884,395 | A | * | 5/1975 | Keenan | 222/176 |
| 4,630,965 | A | * | 12/1986 | Nguyen et al. | 404/107 |
| 4,765,772 | A | * | 8/1988 | Benedetti et al. | 404/77 |
| 5,120,217 | A | * | 6/1992 | O'Brien et al. | 432/120 |
| 5,263,790 | A | * | 11/1993 | Bickley et al. | 404/107 |
| 5,419,654 | A | * | 5/1995 | Kleiger | 404/101 |
| 5,752,782 | A | * | 5/1998 | Hulicsko | 404/103 |
| 6,113,310 | A | * | 9/2000 | Hesse, Jr. | 404/108 |
| 6,164,866 | A | * | 12/2000 | Wulff | 404/108 |

* cited by examiner

Primary Examiner—Gary S. Hartmann
(74) Attorney, Agent, or Firm—Dean P. Edmundson

(57) ABSTRACT

An implement is described for use in filling wheel tracks (e.g. irrigation sprinkler wheel tracks or ruts) with granular fill material. The implement includes a wheeled frame, a hopper with a bottom opening, and a filling guide suspended below the opening in the hopper for guiding fill material directly into the wheel track. Preferably, the filling guide a includes a rear wall which has a concave lower edge to shape or contour the upper surface of the fill material placed in the wheel track.

5 Claims, 4 Drawing Sheets

IMPLEMENT FOR FILLING WHEEL TRACKS

FIELD OF THE INVENTION

This invention relates to equipment and techniques for filling in wheel tracks or ruts created in a field by the wheels of an irrigation sprinkler unit. More particularly, this invention relates to an implement which is towed across a field to fill wheel tracks.

BACKGROUND OF THE INVENTION

Wheeled irrigation sprinkler units (e.g. a pivot sprinkler unit) involve the use of several towers for supporting an elongated pipe through which irrigation water is applied to a field. The towers are each supported on wheels for rolling over the ground. Over a period of time, the wheels form a recessed track or rut in the field. The track or rut is undesirable and can interfere with other farming operations in the field. It can also impede travel over the field with farm tractors or harvesting equipment.

Implements have been described for attachment to wheel towers to follow the wheels and plow or move dirt back into the wheel track. See U.S. Pat. Nos. 4,262,752 and 4,601,347. Another device to fill in wheel tracks is described in U.S. Patent 4,909,334 which involves a pair of rotary tillers powered by a tractor. Such implements have not been entirely satisfactory.

There has not heretofore been provided an implement for filling wheel tracks or ruts having the features and advantages provided by the present invention.

SUMMARY OF THE INVENTION

In accordance with the present invention there is provided an implement for filling wheel tracks or ruts in a field. In one embodiment the implement comprises:

(a) a hopper for carrying a quantity of fill material (e.g. granular material such as soil); wherein the hopper includes a bottom opening and means for selectively opening or closing the opening to regulate the flow of fill material out of the bottom opening; and (b) filling guide means suspended below the bottom opening of the hopper; wherein the guide means includes an open top and bottom for guiding the fill material into the wheel track or rut to be filled.

Preferably, the implement includes a wheeled frame for supporting the hopper and the filling guide. The implement can thereby be towed across a field with a tractor in a manner such that the filling guide is in alignment with the wheel track or rut to be filled. Then the fill material can be dispensed through the bottom opening of the hopper and into the wheel track through the filling guide. As the implement is towed forwardly, the fill material continuously flows into the wheel track to fill it, and the filling guide assures that the fill material flows only into the wheel track. The filling guide also shapes the upper surface of the fill material which has been placed into the track. For example, it is desirable for the upper surface of the fill material to be slightly convex or rounded.

Other features and advantages of the implement of the invention will be apparent from the following detailed description and the accompanying drawings.

BRIEF DESCRIPTION OF THE DRAWINGS

The invention is described in more detail hereinafter with reference to the accompanying drawings wherein like reference characters refer to the same elements throughout the several views and in which.

DETAILED DESCRIPTION OF THE INVENTION

Figure 1:
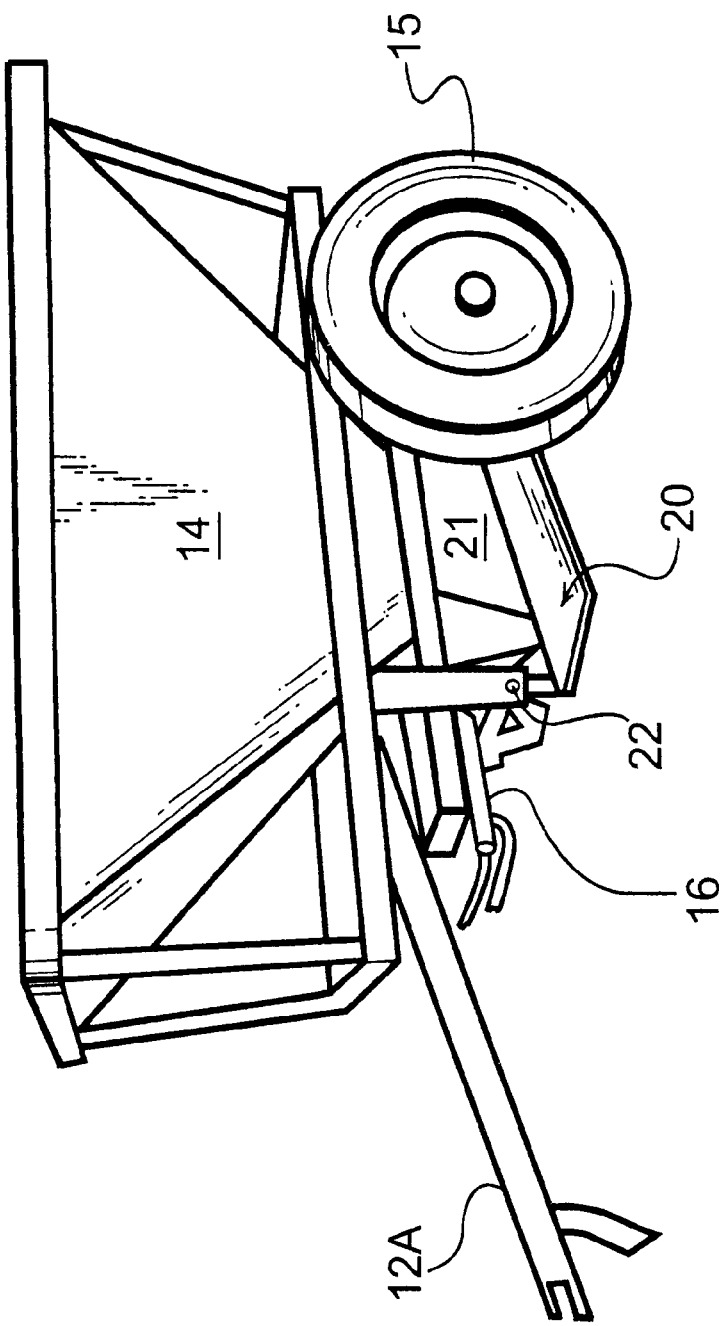
FIG. 1 is a perspective view of one embodiment of an implement of the invention.

In the drawings there is illustrated one embodiment of a wheel track filling implement 10 of the invention. The implement includes a frame 12 supporting a large bin or hopper 14 for carrying a large quantity of the desired granular fill material (e.g. soil, sand, etc.). Wheels 15 are attached to the frame, and a tongue member 12A is provided, to enable the to implement to be towed across a field by a tractor in alignment with the longitudinal direction of a track or rut to be filled. The bottom of the hopper includes a discharge opening 14A for the fill material. Preferably, the bottom opening is selectively opened or closed by means of a sliding door 13 which is connected with tab 13A to a hydraulic cylinder 16. The door is supported along opposite side edges on flanges 11.

Figure 2:
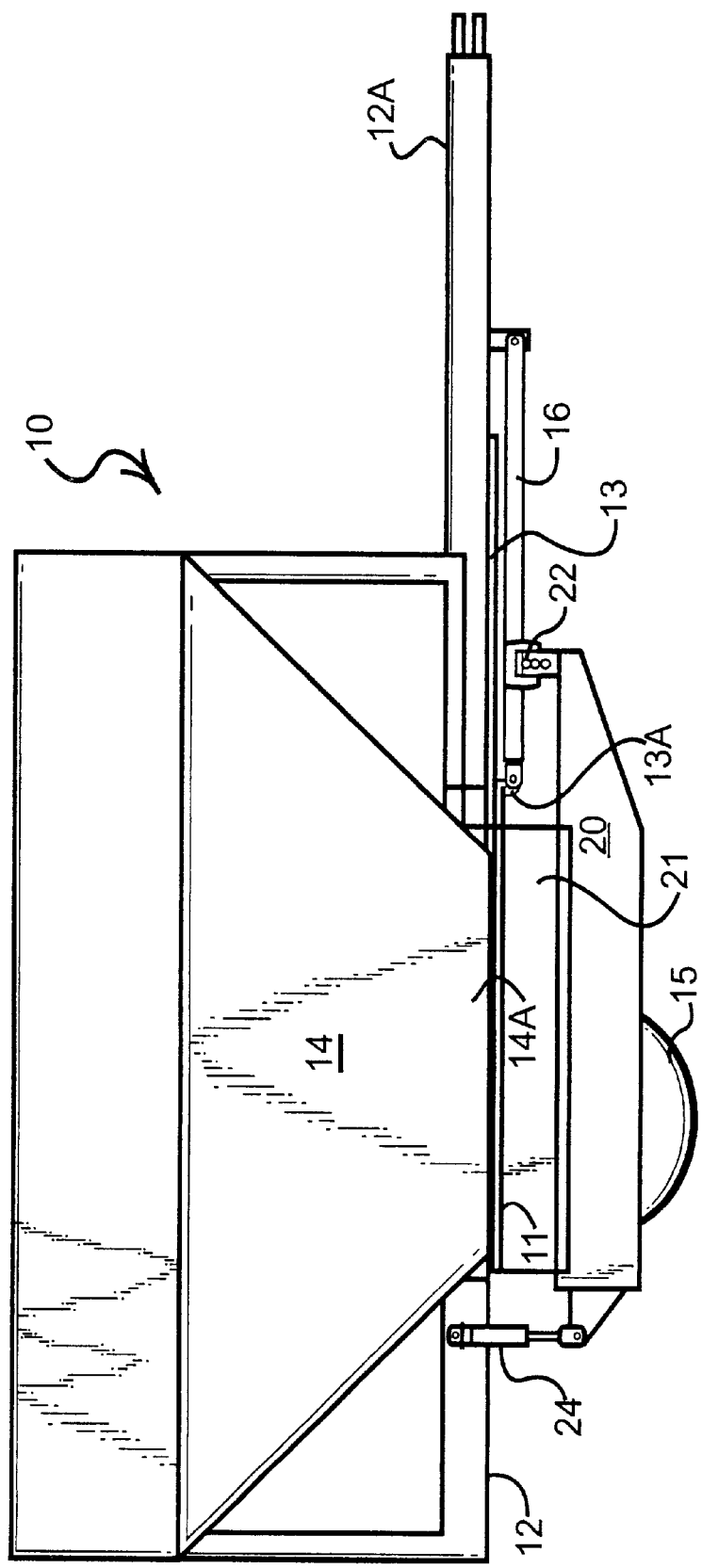
FIG. 2 is a side elevational view of the implement shown in FIG. 1.
Figure 3:
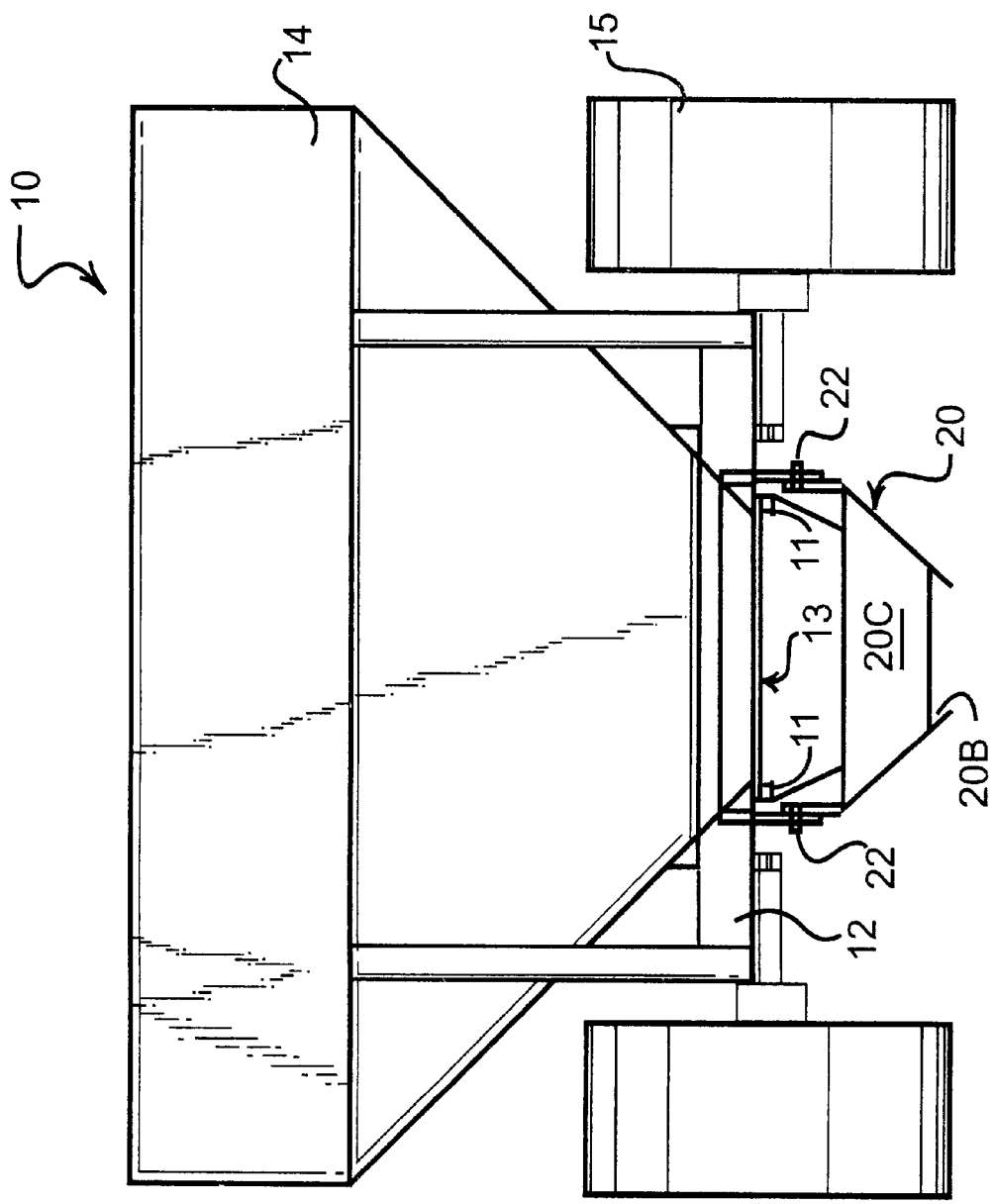
FIG. 3 is a front elevational view of the implement shown in FIG. 1.
Figure 4:
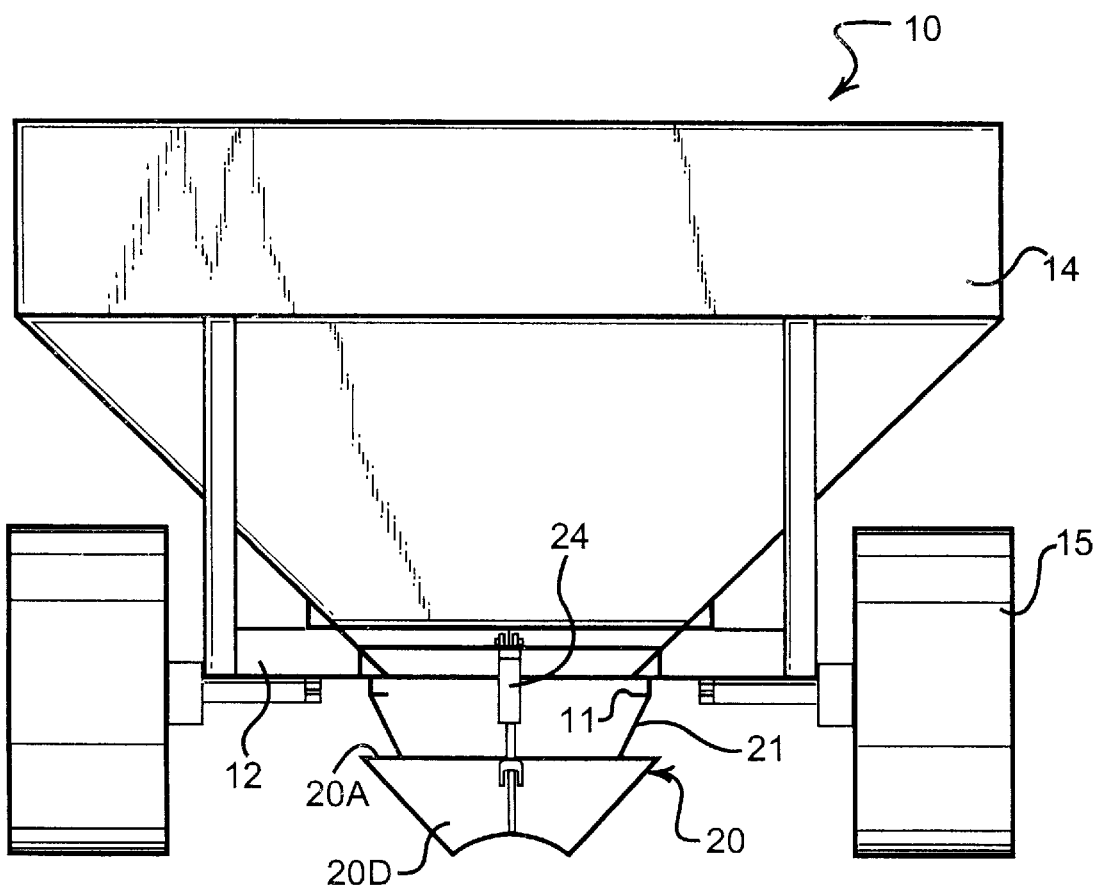
FIG. 4 is a rear elevational view of the implement shown in FIG. 1.
Figure 5:
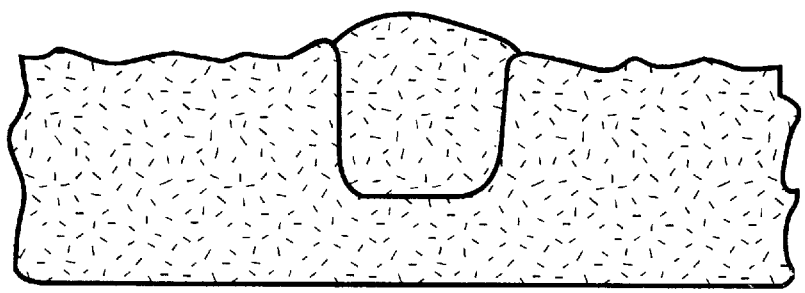
FIG. 5 is a cross-sectional view showing a recessed wheel track or rut in the ground which has been filled with the implement of the invention.

When it is desired to dispense fill material from the hopper, the hydraulic cylinder is actuated to slide the door 13 forwardly (see FIG. 2) to thereby open the discharge opening and allow fill material to flow out of the hopper due to gravity.

As the fill material falls out of the discharge opening in the bottom of the hopper, it is guided through a filling guide 20 suspended below the discharge opening. As illustrated in the drawings, the filling guide may comprise two components, i.e. an upper funnel 21 and guide or screed 20. The upper funnel 21 may be secured to the underside of the hopper and it includes an open top and bottom, with inwardly sloping side walls extending from the top to the bottom. The guide or screed 20 receives the fill material passing through the funnel 21 and guides it into the wheel track or rut in the ground.

The filling guide 20 comprises an elongated enclosure having an open top 20A and an open bottom 20B with side walls connected between the top and bottom openings. There is also a front wall 20C and a rear wall 20D. The side walls are sloped towards each other from top to bottom so that the fill material will be guided toward the bottom opening and directly into the wheel track or rut to be filled.

The forward end of the filling guide is pivotably connected to the frame of the implement by means of pins 22. The rearward end of the filling guide is connected to a hydraulic cylinder 24 carried by the frame. Thus, by operating the hydraulic cylinder 24, the rearward end of the filling guide can be lowered into contact (or near contact) with the ground over the wheel track or rut to be filled. In this manner, the filling guide contains the granular fill material in the proper area so that the fill material falls directly into the wheel track or rut to be filled as the implement is towed across the field in a manner such that the filling guide is in alignment with the track or rut. The lower edge of the rear wall 20D of the filling guide preferably is rounded or concave so that the upper surface of the deposited fill material in the track is slightly convex or rounded.

Other variants are possible without departing from the scope and spirit of this invention. For example, the implement may utilize a larger hopper for carrying the granular fill material, and the implement may include tandem axles and wheels to support the additional weight of fill material being carried in a larger hopper. Also, other designs may be used for the shape of the filling guide or screed.

What is claimed is:

1. In combination with a recessed wheel track created by an irrigation sprinkler unit in a field, an implement comprising:

(a) a wheeled frame;

(b) a hopper carried by said frame for carrying a quantity of fill material; said hopper including a bottom opening and means for selectively opening or closing said opening;

(c) filling guide means suspended below said bottom opening; wherein said guide means includes forward and rearward ends; wherein said forward end is pivotably connected to said frame; wherein said guide means includes an open top and open bottom with side walls extending between said open top and open bottom for guiding said fill material into said wheel track; and (d) hydraulic cylinder means supported by said frame for raising and lowering said rearward end of said filling guide means relative to said hopper.

2. An implement in accordance with claim 1, wherein said filling guide means includes a rear wall with a concave lower edge.

3. An implement in accordance with claim 1, wherein said open bottom of said filling guide means is smaller than said open top.

4. In combination with a recessed wheel track created by an irrigation sprinkler unit in a field, an implement comprising:

(a) a wheeled frame having a tongue member for towing said implement;

(b) a hopper supported by said frame for carrying a quantity of fill material; said hopper including a dispensing opening for said fill material and means for selectively opening or closing said opening;

(c) filling guide means suspended below said dispensing opening; wherein said guide means includes forward and rearward ends; wherein said forward end is pivotably connected to said frame; wherein said guide means includes an open top and an open bottom with side walls extending between said open top and open bottom for guiding fill material from said dispensing opening into said recessed wheel track; wherein said guide means includes a-rear wall with a concave lower edge; and (d) hydraulic cylinder means supported by said frame for raising and lowering said rearward end of said filling guide means relative to said hopper.

5. A method for filling a recessed wheel track created by an irrigation sprinkler unit in a field, the method comprising the steps of:

(a) providing hopper means carried by a wheeled frame; wherein said hopper means contains a quantity of granular fill material; and wherein said hopper means includes a dispensing opening for dispensing said fill material and means for selectively opening or closing said opening;

(b) providing guide means below said dispensing opening for guiding fill material dispensed from said opening; wherein said guide means includes forward and rearward ends; wherein said forward end is pivotably connected to said frame; wherein said rearward end is adapted to be raised or lowered with hydraulic cylinder means supported by said frame; wherein said guide means includes a rear wall having a concave lower edge;

(c) aligning said guide means with said wheel track; and (d) dispensing said fill material through said guide means into said wheel track as said wheeled frame is moved along and in alignment with said wheel track; wherein said concave lower edge of said guide means provides a rounded upper surface of said fill material dispensed into said wheel track.

* * * * *